United States Patent
McBride et al.

(10) Patent No.: US 10,664,368 B2
(45) Date of Patent: May 26, 2020

(54) MODIFYING ASPECTS OF A STORAGE SYSTEM ASSOCIATED WITH DATA MIRRORING

(71) Applicant: International Business Machines Corporation, Armonk, NY (US)

(72) Inventors: Gregory E. McBride, Vail, AZ (US); Dash Miller, St. Louis Park, MN (US); Miguel Perez, Miami, FL (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 15/827,072

(22) Filed: Nov. 30, 2017

(65) Prior Publication Data

US 2019/0163589 A1 May 30, 2019

(51) Int. Cl.
*G06F 11/20* (2006.01)
*G06F 11/30* (2006.01)
*G06F 9/50* (2006.01)
*G06F 11/34* (2006.01)

(52) U.S. Cl.
CPC ........ *G06F 11/2069* (2013.01); *G06F 9/5077* (2013.01); *G06F 11/3034* (2013.01); *G06F 11/3051* (2013.01); *G06F 11/3419* (2013.01); *G06F 11/3442* (2013.01); *G06F 11/3447* (2013.01)

(58) Field of Classification Search
CPC ............. G06F 11/2069; G06F 11/3034; G06F 11/3419; G06F 11/3447; G06F 9/5077
See application file for complete search history.

(56) References Cited

U.S. PATENT DOCUMENTS

| | | |
|---|---|---|
| 6,502,205 B1 | 12/2002 | Yanai et al. |
| 7,434,014 B2 | 10/2008 | Ali et al. |
| 7,434,031 B1 * | 10/2008 | Spracklen ............. G06F 9/3826 712/217 |
| 7,562,250 B2 | 7/2009 | Wahl et al. |

(Continued)

OTHER PUBLICATIONS

List of IBM Patents or Patent Applications Treated as Related (Appendix P), filed herewith.

(Continued)

*Primary Examiner* — Nanci N Wong
(74) *Attorney, Agent, or Firm* — Daniel R. Simek

(57) ABSTRACT

A method for modifying a configuration of a storage system. The method includes a computer processor querying a network-accessible computing system to obtain information associated with an executing application that utilizes a storage system for a process of data mirroring. The method further includes identifying a set of parameters associated with a copy program executing within a logical partition (LPAR) of the storage system based on the obtained information, where the set of parameters dictates a number of reader tasks utilized by the copy program, where the copy program is a program associated with the process for data mirroring from the network-accessible computing system to the storage system. The method further includes executing the dictated number of reader tasks for the process of mirroring data associated with the executing application, from the network-accessible computing system to the storage system.

15 Claims, 4 Drawing Sheets

(56) References Cited

U.S. PATENT DOCUMENTS

| | | | |
|---|---|---|---|
| 8,032,352 B2* | 10/2011 | Bitar | G06F 11/3485 |
| | | | 703/20 |
| 8,060,478 B2 | 11/2011 | Emaru et al. | |
| 2005/0091463 A1 | 4/2005 | Halstead et al. | |
| 2009/0259752 A1* | 10/2009 | McNutt | H04L 67/1097 |
| | | | 709/225 |
| 2013/0212349 A1* | 8/2013 | Maruyama | G06F 12/00 |
| | | | 711/167 |
| 2014/0108749 A1 | 4/2014 | Sato et al. | |
| 2014/0122429 A1* | 5/2014 | Chen | G06F 16/182 |
| | | | 707/623 |
| 2018/0314431 A1* | 11/2018 | Rashid | G06F 12/109 |

OTHER PUBLICATIONS

U.S. Appl. No. 16/668,515, filed Oct. 30, 2019.
Dufsrane et al., "IBM z/OS Global Mirror Planning, Operations, and Best Practices", IBM, Redpaper, Oct. 2013, 116 pps.
"The IntelliMagic White Paper on: Using RMF Magic to Plan and Monitor z/OS Global Mirror (XRC", 34 pps., Jan. 2008, Version 2.

* cited by examiner

MODIFYING ASPECTS OF A STORAGE SYSTEM ASSOCIATED WITH DATA MIRRORING

BACKGROUND OF THE INVENTION

The present invention relates generally to the field of data storage hardware and software, and more particularly to dynamically modifying configuration information related to data mirroring by a storage system.

Disaster recovery systems typically address two types of failures, a sudden catastrophic failure at a single point in time or data loss over a period of time. To assist in recovery of data updates, a copy of data may be available from a remote location. Data mirroring is one copy technology for maintaining remote copies of data (e.g., write activity) at a secondary site or secondary storage system. Data mirroring can occur asynchronously to minimize write delays within a storage system of the primary computing system. To isolate and control the mirroring of data to a secondary storage system, each client (e.g., application owner) utilizing a primary computing system and mirroring data to the secondary storage system has one or more logical partitions (LPARs) provisioned within the secondary storage system to support the data mirroring for applications that generate or modify the data of a client.

In this manner, nearly identical copies of changes to written data are maintained in volume pairs between the primary computing system and the secondary storage system. The data stored on the secondary storage system differs from the data within the primary computing system by a time differential equal to or less than a recover point objective (RPO) value that is dictated by the owner of the application. A client may configure multiple logical storage subsystems (LSSs) within the primary computing system to store write activity generated by an application. Each LSS includes a hardware buffer to maintain data for mirroring; as such, each LSS has a designated communication channel to a logical partition (LPAR) of the secondary storage system utilized for data mirroring. Similarly, each communication channel to the LPAR is assigned a designated communication task, such as a base reader task. A communication task may not utilize the entire bandwidth of a communication channel so additional reader task aliases are created to increase the bandwidth available for mirroring data between the primary computing system and the secondary storage system.

SUMMARY

According to aspects of the present invention, there is a method, computer program product, and/or system for modifying a configuration of a storage system. In an embodiment, the method includes one or more computer processors querying a network-accessible computing system to obtain information associated with an executing application that utilizes a storage system for a process of data mirroring. The method further includes identifying a set of parameters associated with a copy program executing within a logical partition (LPAR) of the storage system based on the obtained information, where the set of parameters dictates a number of reader tasks utilized by the copy program, where the copy program is a program associated with the process for data mirroring from the network-accessible computing system to the storage system. The method further includes executing the dictated number of reader tasks for the process of mirroring data associated with the executing application, from the network-accessible computing system to the storage system.

DETAILED DESCRIPTION

Figure 1:
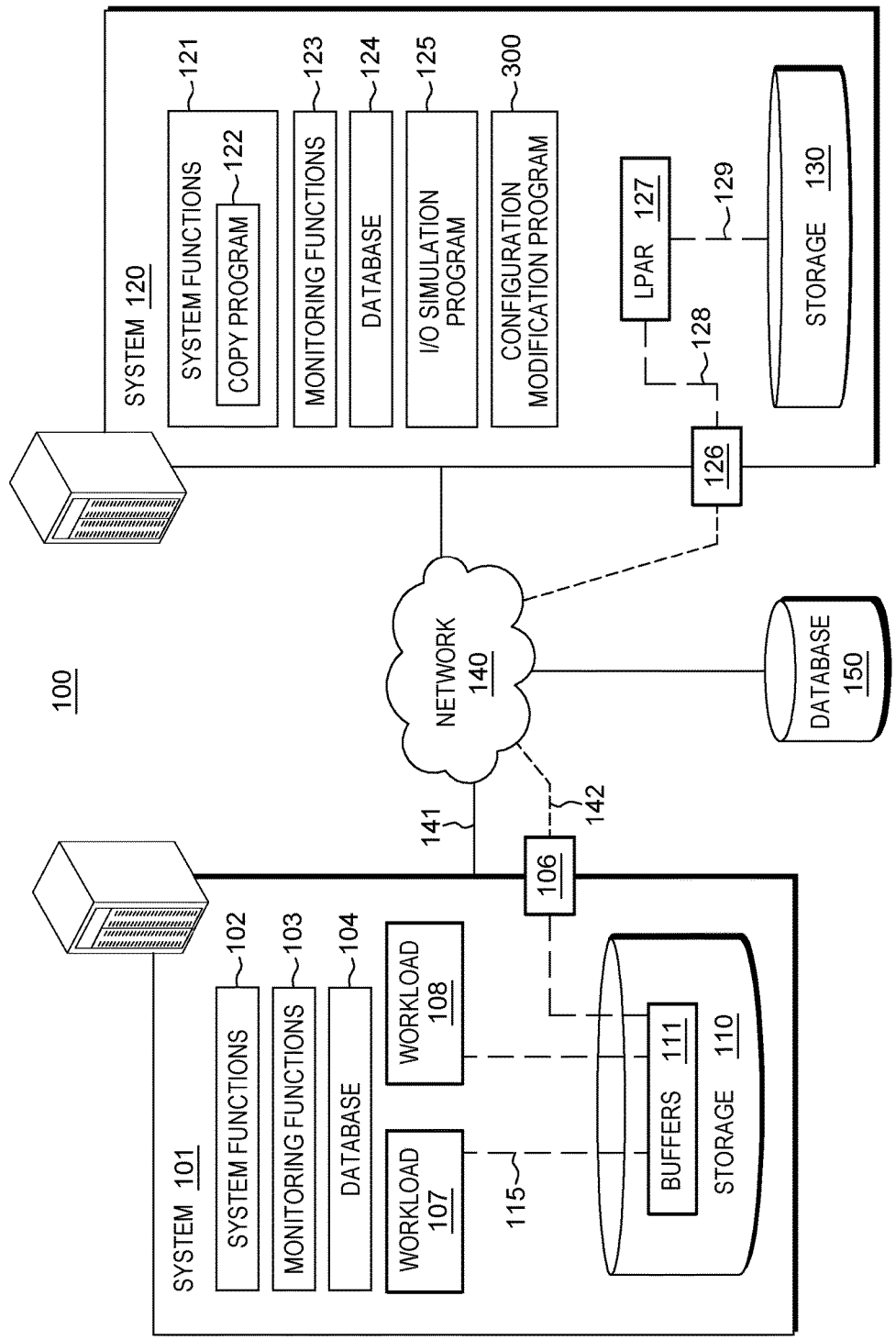
FIG. 1 illustrates a networked computing environment, in accordance with an embodiment of the present invention.

Embodiments of the present invention recognize that protecting data by utilizing data mirroring between a primary computing system and one or more secondary storage systems can occur within the same IT infrastructure (e.g., a company). Alternatively, or in addition to, data mirroring can occur between different IT infrastructures where data mirroring to a secondary storage system is a service purchased by users (e.g., clients) of the primary computing system. As such, changes to rates of data mirroring, bandwidth available within a network for data mirroring, and/or changes to the infrastructure of the primary computing system can affect the performance of the data mirroring associated with a secondary storage system, herein after referred to as a storage system.

Embodiments of the present invention recognize that various aspects of a configuration associated with data mirroring (e.g., within a storage system) are set during an initial period of setup and testing; and remain fixed until modified by a client or an administrator of a storage system. In one example, computing resources and data mirroring parameters for a configuration associated with data mirroring are based on a fixed data rate, such as a median data rate within a 24-hour period. In another example, if the rate of writing data to a logical storage subsystem (LSS) exceeds the capacity (e.g., bandwidth) of a defined network channel for a reader task, then the LSS is divided into smaller grouping of storage volumes and each grouping is assigned a reader task.

Embodiments of the present invention recognize that static allocations of computing resources and parameters related to receiving data for mirroring, such as reader tasks and networking configurations, can become inefficient over time as the rates of data generation vary in response to production activity for an application executing on a primary computing system as opposed to the rates of data generated during the setup and testing period. Changes to hardware configurations and/or the responsiveness of a network transmitting the mirrored data can also affect data mirroring. In some instances, a configuration associated with data mirroring may have insufficient computing resources allocated thus adversely affecting the performance of an application that utilizes data mirroring. In other instances, a configuration associated with data mirroring may have insufficient communication tasks available to receive increased rates of data mirroring in response to increased write activity generated by an application.

Embodiments of the present invention provide a more granular method to respond to changes in rates of data mirroring by enabling changes to the number of reader tasks assigned to each LSS and further controlling the total communication (e.g., network) bandwidth, utilized at any point in time, by varying the number of active reader task aliases for each reader task. Some embodiments of the present invention modify a set of configuration information for a configuration associated with data mirroring in response to changes in rates of data mirroring. Various embodiments of the present invention enable dynamic modification of settings and parameters of a set of configuration information associated with data mirroring as related to the number of active reader tasks and the number of reader task aliases assigned to each reader task utilized by a copy program; and various setting and/or information utilized by the reader tasks, such as communication/network port IDs.

Other embodiments of the present invention periodically analyze aspects of the configurations (e.g., hardware and settings) associated with a client for a primary computing system, a storage system, and a network that communicates the data for mirroring to the storage system to identify changes that affect one or more aspects of data mirroring with respect to communicating data from the primary computing system to the storage system.

An embodiment of the present invention initiates on a periodic basis or in response to an event, such as a system message to reduce the probability of frequent changes (e.g., instability) to a set of configuration information associated with data mirroring. Some embodiments of the present invention modify a configuration and/or setting and parameters of a copy program associated with data mirroring based on monitoring trends related to the changes in rates of data mirroring. Other embodiments of the present invention utilize models, predictive analytics, and/or historical performance monitoring information (e.g., time-based rates) associated with data mirroring to forecast and pre-emptively modify a set of configuration information associated with data mirroring. In addition, embodiments of the present invention can also respond to changes dictated by a client that are associated with data mirroring activity, such as changing the RPO value associated with workloads of an application.

Embodiments of the present invention enable an administrator of a storage system and/or a machine learning program to define threshold values or criteria for one or more factors, aspects, or parameters related to a set of configuration information associated with data mirroring. Threshold values related to factors, aspects, or parameters associated with a set of configuration information enable embodiments of the present invention to determine degree of similarity between sets of configuration information associated with data mirroring for storage system. In an example, an administrator of system 120 can define a degree of similarity between two sets of configuration information based on a weighted average of two or more factors, aspects, or parameters. In another example, a degree of similarity between two sets of configuration information may be determined based on comparing the results of a model that utilizes two or more factors, aspects, or parameters associated with data mirroring.

Further, one skilled in the art would recognize that dynamically modifying a set of configuration information associated with data mirroring improves the operations of a storage system. Dynamic modifications to a set of configuration information and/or setting and parameters of a copy program related to data mirroring based on analyzing trends associated with changes to rates of data mirroring and/or creating models associated with real-world data mirroring occurrences for an application improves the allocation and utilization of computing resources within a storage system. In addition, utilizing simulations of various sets of configuration information associated with data mirroring can further automate the modification of sets of configuration information thereby reducing the frequency of intervention by an administrator of the storage system. As such, the functioning of such a computing system is seen to be improved in at least these aspects.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked computing environment 100 in an embodiment, in accordance with the present invention. In an embodiment, networked computing environment 100 includes: system 101, system 120, and database 150, all interconnected over network 140. In some embodiments, networked computing environment 100 includes one or more instances of system 120 and/or database 150. Many modifications to the depicted environment may be made by those skilled in the art without departing from the scope of the invention as recited by the claims.

System 101, system 120, and database 150 may be: laptop computers, tablet computers, netbook computers, personal computers (PC), desktop computers, personal digital assistants (PDA), smart phones, wearable devices (e.g., digital eyeglasses, smart glasses, smart watches, smart televisions, etc.), or any programmable computer systems known in the art. In certain embodiments, system 101, system 120, and database 150 represent computer systems utilizing clustered computers and components (e.g., database server computers, application server computers, etc.) that act as a single pool of seamless resources when accessed through network 140, as is common in data centers and with cloud-computing applications. In general, system 101, system 120, and database 150 are representative of any programmable electronic device or combination of programmable electronic devices capable of executing machine-readable program instructions and communicating with clients and/or administrators of system 101, system 120, and database 150, via network 140. System 101, system 120, and database 150 may include components, as depicted and described in further detail with respect to FIG. 4, in accordance with embodiments of the present invention.

System 101 (i.e., a primary computing system) includes: system functions 102, monitoring functions 103, database 104, network interface 106, workload 107, workload 108, and storage 110. System 101 may also include various programs and/or databases, such as but not limited to: an operating system, a file management program, a database management system, one or more analysis/statistical programs, etc. (not shown) utilized by system 101 and addition to a plurality of executables associated with clients that host applications on system 101. System 101 includes a plurality of internal communication paths represented by instance of communication path 115 (long-dashed line). In an embodiment, system 101 also includes one or more client-side tasks, such as a storage control session task (not shown) that interface with tasks or protocols utilized by copy program 122 of system 120. In an example, a storage control session task may identifying groups of record sets corresponding to tracks of data that reside in buffers 111 in response to writing the data the tracks among one or more volumes of storage 110. Subsequently, the storage control session task provides the information to a task of copy program 122 that queries system 101 on a periodic basis.

System functions 102 includes, but is not limited to a hypervisor, a system management facility (SMF), virtualization software, a memory management program, a load balancer, a universal time function, communication programs/protocols, etc. In some embodiments, system functions 102 includes various management functions, such as a function that scan configurations associated an application of a client to determine whether an application utilized data mirroring during the execution of the application. In an example, during the initialization of an application, a task of system functions 102 determines that the initializing application utilizes data mirroring. In response, the task of system functions 102 communicates with system 120 indicating to system 120 to enable data mirroring for the application (e.g., provision and activate LPAR 127). In some instances, system functions 102 may include a storage controller session manager (SCSM).

Monitoring functions 103 includes a suite of monitoring functions that can identify hardware assignments within system 101; monitor input/output (I/O) activity (e.g., amounts of data, rates of data, etc.) by various components or applications, such as write activity associated with workload 107; a polling facility to communicate with network 140 to determine various attributes, such as bandwidth, communication delays, network traffic, etc.

Database 104 includes a plurality of profiles and information related to a client, applications (not shown) of a client, hardware profiles for each client and/or application, etc. In an embodiment, a profile associated with a client can include information including: provisioning information for production LPARs (not shown) within system 101, a number of LLSs of storage 110 utilized by an application thereby dictating the number of base reader tasks, storage locations (e.g., a logical unit numbers or volume identifiers) for data within storage 110, one or more RPO time values that corresponds to various sets of data (e.g., workloads) for mirroring to system 120, one or more data mirroring schemes corresponding to an application, networking information utilized for data mirroring, etc. In some scenarios, an application may generate different sets of data written having differing levels of criticality, as indicated by corresponding RPO time values. In an example, an application generates workload 107 and workload 108, where workload 107 is comprised of critical data and, workload 108 is comprised of non-critical data. Database 104 may also include messages from a SMF, such as when instances write pacing were applied to a workload; results of various monitoring functions or analyses of monitoring that identifying rates of write activity for an application or workload; and messages and information associated with network 140.

In some embodiments, database 104 includes information related to a plurality of hardware elements of system 101, such as information corresponding to each DASD/LSS subsystem (e.g., model number, number of logical/physical devices, storage cache size, etc.), information correspond to networking subsystems (e.g., number of channels, bandwidth of a channel, communication port IDs, supported protocols, etc.) represented by network interface 106, computing resources, I/O accelerator hardware, etc.

Network interface 106 is representative of a high-speed network architecture that utilizes communication path 142 of network 140 to communicate with network interface 126 of system 120. Network interface 106 may be representative of physical hardware, virtualized hardware, or a combination thereof. In addition, network interface 106 interfaces with storage 110 and/or buffers 111 via instances of internal communication paths (dashed line) to communicate information (e.g., protocols for data mirroring) and data between system 101 and system 120. In one embodiment, network interface 106 is representative of a network interface card (NIC) and a communication port connected to network 140 by a high-speed, high-reliability connection, such as fiber optic cable. In another embodiment, network interface 106 is representative of a NIC with multiple communication ports connected to network 140 by a set of high-speed, high-reliability connections (e.g., communication path 142). In some embodiments, network interface 106 is representative of a network channel subsystem comprised of a plurality of NICs, communication ports, and high-speed, high-reliability connections.

Workload 107 and workload 108 are representative of data (e.g., write activity), created or modified, to write to volumes (not shown) of storage 110. In an embodiment, workload 107 and workload 108 represent a quantity of data, generated or modified by one or more applications of a client, to write to storage 110. In an embodiment, data is written in discrete units based on the architecture of storage volumes, such as tracks on count key data volumes or blocks of fixed-block architecture volumes. Herein after, units of data are referred to as tracks. Each track of data associated with a workload is written to buffers 111 prior to writing to a persistent storage of storage 110. In an embodiment, a record includes a track of data, a volume identifier (e.g., a volser, a channel connect address, a unit control block, etc.), and a timestamp. In some embodiments workload 107 and/or workload 108 generate a plurality of tracks of data which may organized into one or more groups of record sets.

Storage 110 is representative of an instance of a direct-access storage device (DASD) subsystem. System 101 may include a plurality of instances of storage 110. Storage 110 may include both volatile storage media (e.g., random access memory) and non-volatile storage media (e.g., persistent storage devices), such as flash memory, hard-disk drives (HDDs), and/or solid-state drives (SSDs). In some embodiments, storage 110 includes multiple LSSs (not shown), each comprised of a plurality of logical volumes, physical volumes (i.e., DASD volumes), or a combination thereof. Various volumes within storage 110 form volume pairs with corresponding volumes of storage 130 of system 120 (discussed in further detail with respect to FIG. 2) for data mirroring. In various embodiments, storage 110 includes buffers 111 and a SCSM (not shown) embedded within the firmware (i.e., microcode) of storage 110. Buffers 111 are representative of storage control cache of a storage subsystem (e.g., an LSS) within storage 110. In another embodiment, an instance of SCSM of system functions 102 controls of various aspects of storage 110. In an alternative embodiment, buffers 111 is based on memory external to storage 110. In addition, storage 110 may include components, as depicted and described in further detail with respect to FIG. 4, in accordance with embodiments of the present invention.

System 120 is a storage system (e.g., secondary location) for storing data mirrored from system 101. System 120 may be representative of a network-attached storage (NAS) system, a storage area network (SAN), a SAN-NAS hybrid system, a storage system based on a cloud infrastructure, or any storage device or system utilized as a secondary storage location for data mirrored from system 101. In an embodiment, system 120 includes system functions 121, monitoring functions 123, database 124, I/O simulation program 125, network interface 126, LPAR 127, storage 130, and configuration modification program 300. In addition, system 120 may also include various programs and data (not shown). Examples of programs that system 120 may include are: an operating system, a file management program, a database management system, a suite of analytical, statistical, and modeling programs, a machine learning program, a web interface, etc. System 120 includes a plurality of internal communication paths (long-dashed line) represented by communication path 128 and communication path 129 that transmit data to and from LPAR 127. In some embodiments, system 120 utilizes network 140 to access one or more computing systems (not shown) to provide configuration modification program 300 access to capabilities that may not be included within some instances of system 120, such as a suite of analytical, statistical, and modeling programs; or a machine learning program.

System functions 121 includes, but is not limited to copy program 122, a hypervisor, a system management facility (SMF), virtualization software, a load balancer, a memory management program, a universal time function, communication programs/protocols, etc. In another embodiment, system functions 121 includes a SCSM to control instance of storage 130.

Copy program 122 utilizes a set of parameters that affect tasks related to data mirroring, such as a value for a number of executing reader tasks (e.g., base reader tasks, additional reader tasks, reader aliases), a number of reader aliases assigned to each reader task, a size of a buffer allocated within LPAR 127, a value for a number of journal files processed in parallel, a value for a number of intermediate volumes for striping (i.e., distributing) journal files, etc. Other parameters utilized by copy program 122 includes a frequency for performance monitoring and a location to store performance monitoring information. Multiple instances of copy program 122 can execute within an LPAR utilized for data mirroring, such as LPAR 127. In one embodiment, copy program 122 spawns and controls various tasks utilized for data mirroring, utilizes various protocols, and issues commands via reader tasks to communicate with and "pull" (i.e., retrieve) data from buffers 111 of storage 110. Examples, of other tasks that copy program 122 may spawn include tasks associated with journal creation, journal striping (e.g., migration), memory management, etc.

In some embodiments, copy program 122 includes performance monitoring tasks that track data mirroring activity, such as quantities of data (e.g., a number of record sets) and rates of data (e.g., records) that are mirrored to LPAR 127. Other information associated with performance monitoring include various SMF messages, such as identifying reader task pacing within system 120 or durations of delays associated with buffers 111. In other embodiments, copy program 122 utilizes one or more aspects of monitoring functions 123 to obtain performance data associated with the data mirroring activity, such as quantities of data mirrored and rates of data mirroring. In various embodiments, copy program 122 obtains performance information associated with write activity for an application executing within system 101. For example, a task of copy program 122 queries monitoring functions 103 to determine the rate of write activity related to workload 107.

Monitoring functions 123 include a suite of monitoring functions that can identify hardware assignments within system 120; monitor I/O (e.g., data mirroring) activity processed by network interface 126; a polling facility to communicate with network 140 to determine various information, such as bandwidth, communication delays, network traffic; a computing resource monitor; etc.

Database 124 includes a plurality of profiles and information related to: one or more clients; applications (not shown) of the one or more clients; hardware profiles, software profiles, and/or provisioning information associated with each client and/or application of system 101; information related to network 140; a set of configuration information for data mirroring within system 120; and historical monitoring information, such as performance monitoring information, system monitoring information, and SMF messages. In addition, database 124 may include a plurality of sets of configuration information, sets of parameters for instances of copy program 122 created by one or more administrators and/or expert associated with system 120, and/or default responses utilized by an instance of configuration modification program 300. The information within database 124 may be configurations, settings, and parameters: tuned by an administrator of a storage system (e.g., performance and test experts), compiled over time based on models and/or machine learning, and simulations to determine the responses to various changes to a configuration information, settings and/or parameters utilized by a copy program associated with data mirroring.

In one embodiment, a profile associated with a client can include information, such as provisioning information for LPAR 127; volume pair identifications (e.g., volume IDs of storage 130 corresponding to volume ID's within storage 110) utilized by an application; LSS IDs; one or more RPO time values that correspond to data of various workloads for mirroring to system 120; workloads assigned to each instance of copy program 122; constraints of the frequency for modifying a set of configuration information.

Database 124 may also include one or more models based on data mirroring activity, threshold values related to factors, aspects, parameters, and/or degrees of similarity related to configurations associated with data mirroring, etc. In an example, one set of thresholds are associated with models and/or reactions to rates of data mirroring. In another embodiment, a set of configuration information for data mirroring within database 124 includes a set of parameters utilized by an instance of copy program 122 executing within LPAR 127. In some scenarios, an application may identify different instances of data written by the application as having differing levels of criticality, as indicated by corresponding RPO time values. In various embodiments, database 124 also includes messages from a SMF, such as when instances write pacing were applied to a workload within system 101; and results of various monitoring functions (e.g., monitoring functions 123, copy program 122), and/or analyses of monitoring data mirroring activity. In once example, database 124 includes a cross-reference of parameters and sets of configuration information associated with data mirroring to various network bandwidths and data mirroring rates. In another example, database 124 includes various models or analyses of instances of historical data mirroring activity (e.g., performance data) that can be utilized to determine a set of configuration information associated with data mirroring for a client, or to input to I/O simulation program 125 to test a modification to a set of configuration information associated with data mirroring.

In further embodiments, database 124 includes a plurality of models, predictive analytics, statistical analyses, and cross-references among actual and simulated I/O activity (e.g., data mirroring performance information). The various models and statistical analyses are associated with I/O write activity (e.g., data mirroring) with respect to one or more metrics. In an example, I/O write activity may be expressed with respect to one or more time-based statistical values, such as mean, median, standard deviation, moving average, etc. In another example, I/O write activity may be expressed with respect to a frequency of occurrences of various conditions, such as a frequency and duration of maximum I/O burst rates determined for an instance of data mirroring by an application, or durations of write pacing within system 101. Database 124 may include information relating to the relationships and interactions among the stored information as identified by machine learning.

In one embodiment, database 124 periodically uploads new profiles and sets of configuration information associated with data mirroring to database 150. In another embodiment, database 124 receives new and/or updated profiles and sets of configuration information associated with data mirroring from database 150. In an example, in response to restarting system 120, system 120 updates database 124 with information from database 150.

I/O simulation program 125 simulates data mirroring activities without utilizing actual client (i.e., user) data. In an example, I/O simulation program 125 simulates receiving data for mirroring via different numbers of reader tasks. I/O simulation program 125 recreates real-world data mirroring activity based on statistical models, parametric models, time-variant models, polynomial models, rational functions, or a combination thereof. I/O simulation program 125 may also include probabilistic and frequency of occurrence (e.g., distribution) factors within a simulation of I/O activity (e.g., data representative of records mirrored to system 120). In an example, I/O simulations program 125 may generate bursts of data at random intervals and of varying intensity (e.g., peak data rates of data generation).

Network interface 126 is representative of a high-speed network architecture that utilizes communication path 142 of network 140 to communicate with network interface 106 of system 101. Network interface 126 may be representative of physical hardware, virtualized hardware, or a combination thereof. In addition, network interface 126 interfaces with LPAR 127 via internal communication path 128 (long-dashed line) to communicate information (e.g., protocols for data mirroring), receive data (e.g., records sets) for data mirroring, and obtain data and information from system 101 and system 120. Network interface 126 is representative of one or more network interfaces, subsystems, and/or communication ports previous discussed with respect to network interface 106.

LPAR 127 is representative of a logical partition associated with a client, utilized to mirror data generated by an application of the client (not shown) executing within system 101 to target volumes (e.g., volume pairs) included in storage 130 associated with the client. In an embodiment, LPAR 127 is provisioned within system 120 based on information related to a set of configuration information associated with data mirroring. In an embodiment, provisioning information for LPAR 127 is included within a set of configuration information stores in a database, such as database 124 or database 150. Provisioning information for LPAR 127 includes, but is not limited to, computer processor resources, I/O accelerators resources, storage, and memory. LPAR 127 may include multiple executing instances of copy program 122 and a plurality of tasks associated with instances of copy program 122.

Storage 130 is representative of an instance of a direct-access storage device (DASD) subsystem. System 120 may include a plurality of instances of storage 130. Storage 130 may include both volatile storage media (e.g., random access memory) and non-volatile storage media (e.g., persistent storage devices), such as hard-disk drives (HDDs), solid-state drives (SSDs), etc. In one embodiment, storage 130 includes multiple of logical storage subsystems (LSS), each comprised of a plurality of logical volumes, physical volumes (i.e., DASD volumes), or a combination thereof. In various embodiments, storage 130 includes a SCSM embedded within the firmware (i.e., microcode) of storage 130. Various volumes within storage 130 are target storage volumes paired (e.g., logically associated) to volumes of storage 110 for data mirroring based on volume identifiers, such as volsers, defined within a profile in database 124.

In some embodiments, the volumes of storage 130 are comprised of storage devices with characteristics, such as access times, write speeds that are equal-to or better-than the paired volumes of storage 110 to minimize impacts to data mirroring. In various embodiments, volumes of a volume pair within storage 130 of system 120 have the same capacity and device geometry (e.g., track capacity and number of tracks per cylinder) as volumes of a volume pair within storage 110. In another embodiment, storage 130 includes a hierarchy of storage volumes associated with data mirroring. In an example, storage 130 includes a set journal volumes (e.g., intermediate storage volumes) (not shown) that are utilized for offload journal files of LPAR 127 prior to distributing the tracks of each journal file to corresponding target volumes of volume pairs (discussed in further detail with respect to FIG. 2). In addition, storage 130 may include components, as depicted and described in further detail with respect to FIG. 4, in accordance with embodiments of the present invention.

Configuration modification program 300 is a program for modifying a set of configuration information for a configuration of a storage system associated with data mirroring. In particular, configuration modification program 300 modifies one or more aspects of a set of configuration information, such as the settings and parameters related to reader tasks and network communications associated with retrieving data for mirroring from buffers 111 of system 101 to LPAR 127 of system 120. One or more instances of configuration modification program 300 can execute within LPAR 127. In some scenarios, configuration modification program 300 activates in response to provisioning LPAR 127. In other scenarios, configuration modification program 300 activates in response to a triggering event, such as a dictate from copy program 122, a message from a SMF, or a change corresponding to a rate of data mirroring identify by a monitoring function (e.g., an aspect of monitoring functions 123 or monitoring functions 103). In various scenarios, configuration modification program 300 delays applying one or more changes to a configuration associated with data mirroring until after in-process consistency groups (e.g., record sets) are received from system 101 to a buffer within LPAR 122 (discussed in further detail with respect to FIG. 2). In one embodiment, configuration modification program 300 is a task included within copy program 122. In another embodiment, configuration modification program 300 is an ancillary program of system 120 called by an instance of copy program 122.

In various embodiments, configuration modification program 300 dynamically modifies a configuration, such as the settings and parameters utilized by copy program 122 associated with data mirroring while data (e.g., records) is mirrored from system 101 to system 120. Configuration modification program 300 can dynamically modify a configuration associated with data mirroring in response to one or more conditions or criteria, such as a trend in a rate of data received to system 120, a triggering event, a SMF message from system 101 or system 120, and/or a forecast change (e.g., by one or more models) to a rate of data generation for mirroring associated with system 101. Configuration modification program 300 may be constrained to a number of configuration modifications within a period of time as opposed to each event, trigger, and/or message that occurs.

In some embodiments, configuration modification program 300 initiates with the provisioning of LPAR 127. Subsequently, configuration modification program 300 determines whether any changes are detected among a profile of a client/application, system 101, system 120, and/or network 140 that affect one or more aspects of data mirroring. In an example, configuration modification program 300 may determine that, based on traffic within network 140, that the total bandwidth available for the allocated instances of communications paths 142 will not support the peak rates of data mirroring for workload 108. Configuration modification program 300 can modify a profile and related configuration for system 101 and system 120 to include: additional communication ports associated with network interfaces 106 and 126 and corresponding instances of communication path 142, and generating additional reader tasks of copy program 122 to utilize the additional instances of communication path 142.

In other embodiments, configuration modification program 300 responds to a determination that a change to a rate of data mirroring, is not forecast by one or more models or analyses of historical performance data, by determining a different modification to the set of configuration associated with data mirroring. In some scenarios, configuration modification program 300 scans one or more databases to find a set of configuration information that is associated with a similar rate of data mirroring and information related to hardware and settings of system 120 utilized to support an application that mirrors data to system 120. In some scenarios, configuration modification program 300 utilizes various cross-referenced information related to one or more simulations generated by I/O simulation 125 to determine sets of parameters and configuration settings related to various simulated rates of I/O activity. Configuration modification program 300 may identify the cross-referenced information related determine sets of parameters and configuration settings related to various simulated rates of I/O activity within database 124 and/or database 150.

In one embodiment, system 120 communicates through network 140 to system 101 and one or more instances of database 150. Network 140 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 140 can be any combination of connections and protocols that will support communications between system 101, system 120, and one or more instances of database 150, in accordance with embodiments of the present invention. In some embodiments, network 140 utilize high-speed, high-reliability communication connections, such as communication path 142 (short-dashed line) to processes the communication protocols and data mirroring between system 101 and system 120, as well as communicating updated sets of configuration information associated with data mirroring to database 150. Communication path 142 may be representative of a plurality of network connections (e.g., infrastructure) that connect system 101 to system 120 by respective instances of network interfaces 106 and 126. In some scenarios, an instance of communication path 142 is subdivided into network connections associated with active reader tasks. In an example, an instance of communication path 142 is network channel of a bandwidth of 8 GB/sec with 2 GB/sec assigned to a base reader task and up to three additional reader task aliases of 2 GB/sec can be assigned to this instance of communication path 142.

In another embodiment, network 140 includes communication path 141 (solid line) based on other communication protocols and connections that utilized for less time-sensitive than information and data processed by instances of communication path 142. For example, system 120 may utilize a file transfer protocol to upload information to or download data from database 150. In various embodiments, network 140 operates locally via wired, wireless, or optical connections and can be any combination of connections and protocols (e.g., personal area network (PAN), near field communication (NFC), laser, infrared, ultrasonic, etc.).

Database 150 is representative of one or more shared databases that are utilized as a centralized storage location for sets of configuration information associated with data mirroring for a plurality of storage systems (e.g., instances of system 120) utilized for data mirroring. Information within database 150 is periodically updated with information from database 124 of an instance of system 120. In various embodiments, database 150 includes a plurality of information and data previous discussed with respect to database 124.

Figure 2:
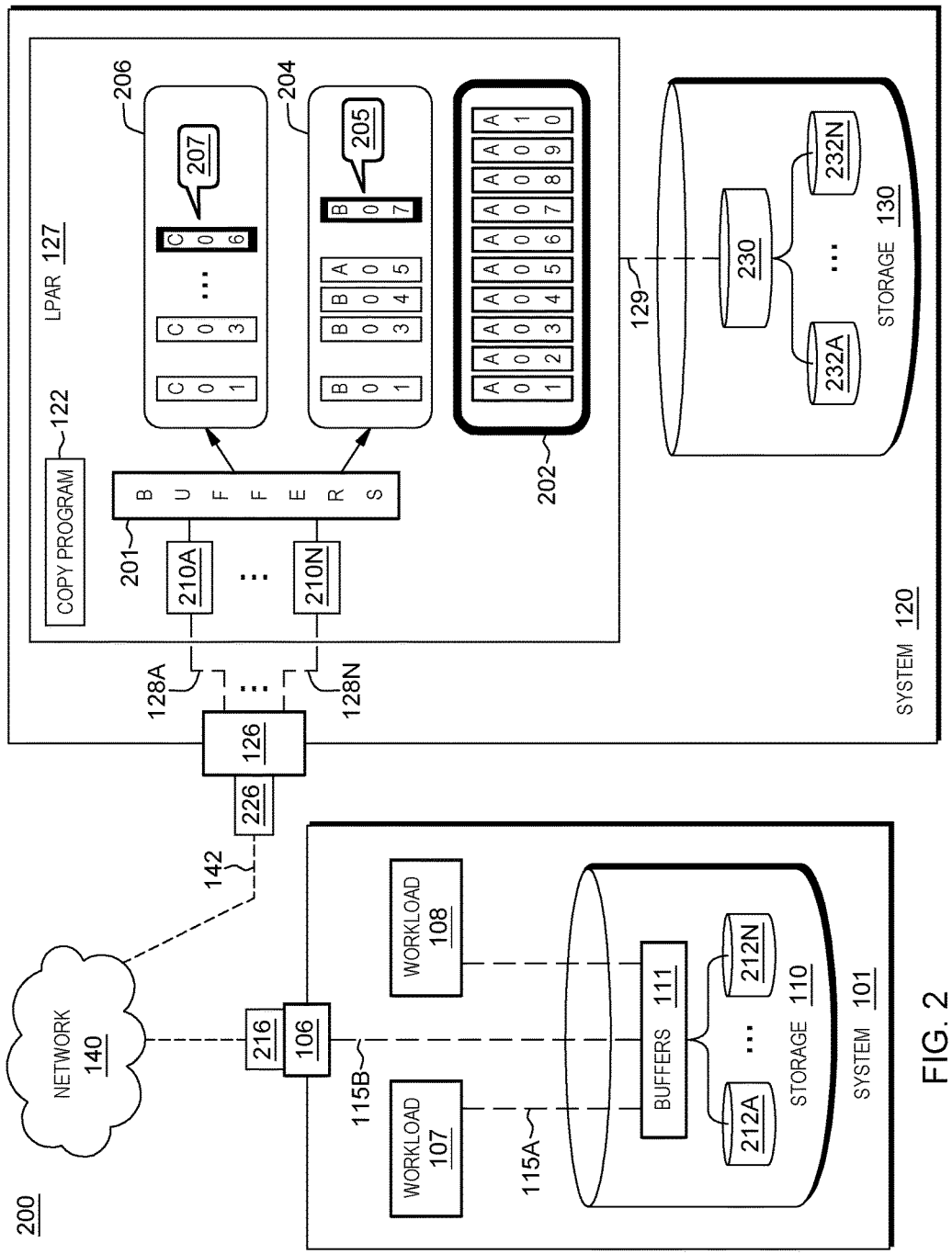
FIG. 2 illustrates additional details associated with mirroring data to a storage system that includes dynamic journaling, in accordance with an embodiment of the present invention.

FIG. 2 is an illustrative example of various aspects of data mirroring between a primary computing system and a storage system, in accordance with embodiments of the present invention. Within system 101 (i.e., the primary computing system), an application (not shown) generates one or more instances of workload 107 and workload 108. In an embodiment, storage 110 includes one or more DASD subsystems or LSSs (not shown) that each include a SCSM (not shown), a corresponding instance of buffers 111, and a plurality of logical or physical volumes for storing data represented by volumes 212A through 212N. Volumes 212A through 212N are representative of client-side (e.g., source) volumes. Volumes 232A through 232N of storage 130 of system 120 are corresponding server-side (e.g., auxiliary, target) volumes of volume pairs utilized for mirroring data from system 101. In an example, a profile for a client of an application that generates data represented by workload 107 includes a list of volume pair identifications (e.g., volsers), such as volumes 212A and 232A form a volume pair, and volumes 212G and 232G form another volume pair.

Buffers 111 receives write activity, such as a plurality of tracks (not shown) represented by workload 107 and workload 108, via one or more internal communication paths 115A (long-dashed line). Instances of internal communication paths 115A and 115B can be physical data busses, portions of a virtual LAN (VLAN), etc. within system 101. In various embodiments, tracks of data associated with workload 107 and workload 108 are stored and processed concurrently. In an embodiment, the SCSM of a LSS (not shown) writes a track of data within a corresponding instance of buffers 111 to one volume of the LSS of storage 110, such as volume 212K. In some embodiments, in response to receiving a write acknowledgement from a volume associated with the LSS of storage 110 that stores the track of data, the SCSM creates a record corresponding to the track within buffer 111 that includes a timestamp and an ID of the volume that stores the track. In various embodiments, system 101 includes a client-side task (not shown) that identifies one or more groups of data among the tracks of data represented by workload 107 and workload 108 and organizes the records associated with the stored tracks of data into record sets (not shown) based on one or more criteria, such as timestamps. In some scenarios, the client-side task is included in a configuration for system 101 associated with data mirroring. In other scenarios, the client-side task is a task spawned (e.g., generated) or initiated by copy program 122 on system 120 and transmitted to system 101 in response to the initiation of LPAR 127.

In one embodiment, storage 110 utilizes network interface 106 via internal communication path 115B to communicate with and received commands from one or more reader tasks or reader task aliases (not shown) spawned or initiated by an instance of copy program 122 executing within LPAR 127 of system 120. In another embodiment, a SCSM (not shown) utilizes internal communication path 115B and network interface 106 to communicate information and commands between buffer 111 and one or more reader tasks or reader task aliases (e.g., 210A through 210N) spawned or initiated by an instance of copy program 122 executing within LPAR 127 of system 120. System 101 communicates with system 120 via network interface 126 utilizing one or more instances of communication path 142 (e.g., communication channels) of network 140.

In some embodiments, the number of instances of communication path 142 utilized to mirror data from system 101 to system 120 is based on one or more sets configuration information associated with mirroring data corresponding to system 101 and/or system 120, such network channel subsystems (not shown), associated NICs, and communication ports (e.g., physical and/or virtual) corresponding to each NIC. Each communication port is associated with a physical or virtual port identifier (ID). Element 216 is representative of a plurality of physical and/or virtual communication ports associated with one or more instances of network interface 106 respectively associated with at least an instance of communication path 142. Similarly, element 226 is representative of a plurality of physical and/or virtual communication ports associated with one or more instances of network interface 126 respectively associated with at least an instance of communication path 142. In an embodiment, each base reader task, additional reader task, and reader task alias may be associated with a pair of port IDs related to instances of element 216 of network interface 106 and corresponding instances of element 226 of network interface 126.

LPAR 127 includes at least one instance of copy program 122 and a portion of allocated memory (not shown) not assigned to buffers 201. Copy program 122 generates various tasks (not shown) utilized to mirror data from system 101 to storage 130 of system 120. Elements 210A through 210N are representative of reader tasks and/or reader task aliases (not shown) spawned or activated by an instance of copy program 122 and utilize internal communication paths 128A through 128N of system 120 to access one or more instance of network interface 126. In an embodiment, a set of configuration information associated with data mirroring defines the bandwidth of internal communication paths 128 through 128N and the network channel subsystems, NICs, etc. represented by communication network interface 126 and communication ports (e.g., element 226) that communicate with system 101 over network 140. In some embodiments, the set of configuration information associated with data mirroring includes a set of parameters utilized by copy program 122 (e.g., a number of reader tasks, a number of reader task aliases assigned to each reader task, a size of memory allocated to buffers 201, etc.). In an example, the communication bandwidth for data mirroring is affected by a number of reader tasks and reader task aliases that copy program 122 spawns within LPAR 127 based on one or more parameters included in a set of configuration information associated with data mirroring.

One or more instances of copy program 122 may execute within LPAR 127. An instance of copy program 122 spawns one or more reader tasks and/or activates one or more reader task aliases (e.g., elements 210A through 210N) that issue one or more commands to asynchronously "pull" record sets from buffers 111. In an embodiment, a reader task of copy program 122 periodically polls (e.g., issues channel commands to) the SCSM of storage 110 to identify updated records within buffers 111, such as tracks that were written to various volumes of a LSS since the prior communication for mirroring data associated with the reader task. In another embodiment, a task of copy program 122 periodically issues one or more commands directly to a LSS of storage 110 to identify tracks that were written to various volumes since the prior communication for mirroring data. In one embodiment, data records within buffers 111 are identified and organized as record sets based on the timestamps between the current data poll and the previous data poll. In addition, the volume identifiers corresponding to the volumes within storage 110 that store each track of data are included in a record. In various embodiments, information associated with a data mirroring protocol identifies the number of records included in a record set. In one example, the numbers of records within a record set is included in a response to a channel command issued by a task of copy program 122.

In various embodiments, the transmission of a record set from system 101 to system 120 occurs via multiple instances of communication path 142 corresponding to a set of related reader tasks and read task aliases that initiated the "pulling" (i.e., retrieving) of a record set. In an example, element 210A is a reader task that is assigned three reader task aliases (e.g., elements 210B, 210C, and 210D). If reader task 210A is busy retrieving a first record set (not shown) from buffers 111 of storage 110 to buffers 201 of LPAR 127 for temporary storage within buffers 201 and a second larger record set (not shown) is generated within buffers 111 for mirroring to LPAR 127, then reader task aliases 210B and 210C may share the retrieval of the second record set. Thus, reader task aliases 210B and 210C effectively increase the available bandwidth to mirror the second record set to LPAR 127 and reduce the duration of a delay associated with releasing memory space of the second record set within buffers 111.

The size of memory allotted to buffers 201, from the provisioned memory of LPAR 127, is based on a parameter within the set of parameters included in the set of configuration information associated with data mirroring and/or parameters associated with an instance of copy program 122 executing within LPAR 127. If buffers 201 is not sufficiently large to store the records of data retrieved by a plurality of reader tasks and reader task aliases (e.g., elements 210A through 210N), then copy program 122 may initiated reader pacing to delay the retrieval of subsequent record sets from buffers 111. Delaying the retrieval of data from buffers 111 for too long may dictate that system 101 initiates write pacing for the application that generates the workload (e.g., workload 108) writing tracks of data to buffers 111, thereby affecting the performance of the application.

In an embodiment, a task of copy program 122 identifies records stored within buffers 201 and organizes (e.g., groups) records into consistency groups based on timestamps and other information related to record sets (not shown) stored within buffers 111 of storage 110. In an embodiment, copy program 122 identifies the number of records that comprise each record set based on receiving information (e.g., metadata) associated with a data mirroring protocol. In an example, copy program 122 determines that consistency group 204 will include seven records (e.g., tracks) as indicated by callout 205 associated with element B07 (dark-bordered box). Similarly, copy program 122 determines that consistency group 206 will include six tracks as indicated by callout 207 associated with element C06 (dark-bordered box). In the illustrative example, copy program 122 determines that consistency group 204 is incomplete, comprised of four of seven records: B01, B03, and B05; and that consistency group 206 is also incomplete, comprised of two of six records: C01 and C03.

In an embodiment, the rate of mirroring data from system 101 to system 120 is affected by the number of reader tasks associated with an instance of copy program 122 and resources available within LPAR 127. The rate at which copy program 122 can identify records within buffers 201 and consolidate the identified records into consistency groups to create journal files is based on rates of data received to LPAR 127 and the computing resources provisioned to LPAR 127. Examples of computing resource that affect the copy program 122 are a number of central processing units (CPUs) provisioned, a speed of the CPUs, and whether I/O accelerators are provisioned to LPAR 127. If LPAR 127 is resource constrained (e.g., buffers 201 is too small), then creating additional reader tasks or reader tasks aliases will not improve the rate of retrieving record sets (i.e., data) from system 101.

In response to copy program 122 determining that a full set of records for a consistency group is received to buffers 201, copy program 122 "hardens" the consistency group to create a journal file. In an example, copy program 122 determines that records A01 through A10 comprise a complete consistency group (not shown), and a task of copy program 122 creates journal file 202 (dark-bordered, rounded cornered box) within the real-storage of LPAR 127. In some embodiments, in response to creating a consistency group, a task (not shown) of copy program 122 utilizes instances of communication path 142 to acknowledge the I/O activity related to creating the consistency group to system 101. The acknowledgement from the task of copy program 122 enables a SCSM of associated with an LSS of system 101 to release memory within buffers 111 corresponding the one or more record sets related to the acknowledgement.

Journal file 202 exists within the real storage (e.g., volatile memory) of LPAR 127 as opposed to residing within buffers 201. Journal file 202 is representative of one or more instances of journal files that are associated with data mirroring activities of copy program 122. In an embodiment, in response to copy program 122 creating one or more instances of journal file 202, another task of copy program 122 writes (e.g., migrates, stripes) journal file 202 to intermediate storage 230 via internal communication path 129. In various embodiments, in response to a successful write (e.g., a write acknowledgement message) of journal file 202 to intermediate storage 230, a memory management task (not shown) within LPAR 127 releases the memory space within buffers 201 corresponding to a consistency group related to journal file 202 and the real storage of LPAR 127 corresponding to journal file 202.

In one embodiment, copy program 122 includes metadata within a journal file to indicate which volume of storage 130 stores each record of a journal file. In another embodiment, each record (e.g., A01 thru A10) within journal file 202 retains the storage location information corresponding to a volume within storage 110. In some embodiments, in response to successfully migrating journal file 202 to intermediate storage 230, a SCSM (not shown) of storage 130 identifies the volume identifier (e.g., volser) corresponding to each record within journal file 202 and distributes the records comprising journal file 202 to the identified volumes within storage 130 that are paired to volumes within storage 110. Volume pair information may be included within a profile for a client included in database 124. In an example, if record A01 was written to volume 212C of storage 110, and volume 212C/232C are identified as volume pairs, then the mirrored copy of record A01 is written to the corresponding volume within storage 130, volume 232C.

Figure 3:
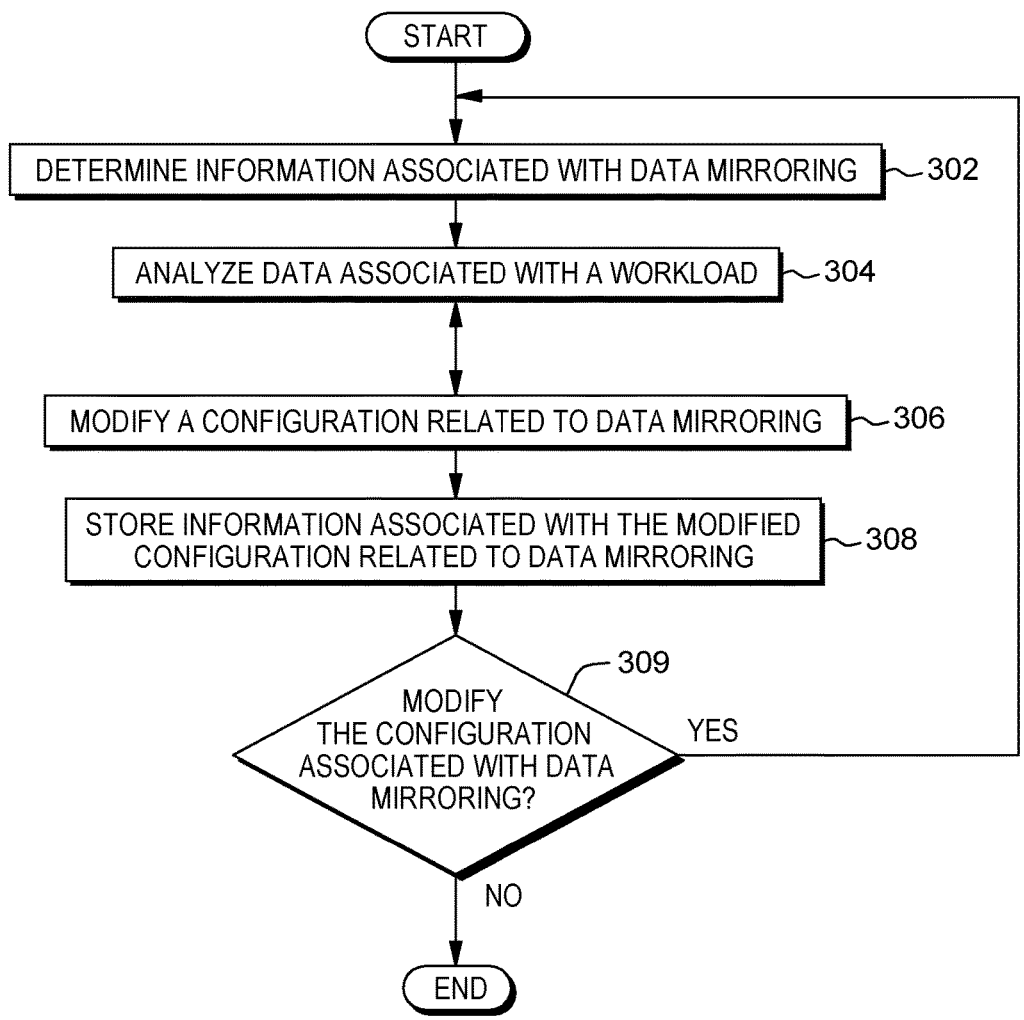
FIG. 3 depicts a flowchart of the operational steps of a storage system configuration modification program, in accordance with an embodiment of the present invention.

FIG. 3 is a flowchart depicting operational steps for configuration modification program 300, a program for modifying a set of configuration information associated storing data mirrored to a storage system for one or more applications of a primary computing system, accordance with embodiments of the present invention.

In some embodiments, multiple instances of configuration modification program 300 can execute concurrently within system 120, such as within LPAR 127 to support data mirroring associated with different workloads of an application/client (e.g., workload 107 as opposed to workload 108). Each instance of configuration modification program 300 may be respectively associated with an instance of copy program 122; and each instance of copy program 122 can utilize a different set of setting and parameters included in a set of configuration information associated with data mirroring. In one embodiment, one or more instances of configuration modification program 300 are copied to LPAR 127, and execute in the background in a paused state until called by an instance of copy program 122. In another embodiment, configuration modification program 300 is a task that is spawned (e.g., initiated) by an instance of copy program 122. In one scenario, copy program 122 spawns an instance of configuration modification program 300 in response to copy program 122 initiating. In another scenario, copy program 122 spawns an instance of configuration modification program 300 based on copy program 122 responding to one or more triggers, such as a SMF message or information obtained by another task or system function providing performance information related to rates of data mirroring.

In step 302, configuration modification program 300 determines information associated with data mirroring. In one embodiment, configuration modification program 300 determines a set information associated with mirroring data based on information related to an application (not shown) of system 101 that mirrors data of one or more workloads to system 120. In an example, configuration modification program 300 queries database 124 to obtain information associated with a profile for the application of system 101 that mirrors data to system 120. An another embodiment, configuration modification program 300 utilizes one or more system functions of system 101 and/or system 120 to determine changes within networked computing environment 100 that affect data mirroring, such as hardware changes to system 101, system 120 and/or network 140, a level of loading associated with system 101 and/or system 120, an amount of traffic within network 140, etc. In an example, configuration modification program 300 queries various aspects of monitoring functions 103 and/or monitoring functions 123 to obtain information related network interface 106, network interface 126, and instances of communication path 142 utilized to mirror data from system 101 to system 120, such as communication port assignments, a number of network connections, and a bandwidth available for each network connection.

In various embodiments, configuration modification program 300 responds to a decision to modify the configuration associated with data mirroring (Yes branch, decision step 309) by determining whether one or more changes occurred to the information associated with data mirroring. In some scenarios, if configuration modification program 300 determines that one or more changes occurred that affect data mirroring, then configuration modification program 300 may query one or more databases (e.g., database 124 and/or database 150) to obtain additional information associated with a profile for the application that mirrors data to system 120, one or more models related to data mirroring, etc. In other scenarios, configuration modification program 300 pauses at step 302 awaiting a determination that one or more changes occurs that affect data mirroring. In another scenario, if configuration modification program 300 determines that one or more changes do not occur that affect data mirroring, then configuration modification program 300 pauses at step 304 awaiting an analysis of a workload that indicates a change to a rate of data mirroring or forecasts a change associated with data mirroring.

In step 304, configuration modification program 300 analyzes data associated with a workload. The data associated with a workload can includes a time, a date, quantities and rates of data mirroring based on historic data stored within a database (e.g., database 104 and/or database 124), quantities and rates data mirroring for a currently executing application (not shown) and one or more related workloads, or a combination thereof. Other data associated with a workload may also include SMF messages associated with system 101, SMF messages associated with system 120, performance information obtained by an instance of copy program 122, performance information related to LPAR 127, and/or information associated with data mirroring determined at Step 302. In one embodiment, configuration modification program 300 obtains performance information from a task corresponding to an instance of copy program 122 that is associated with data mirroring for workload 107 and/or workload 108. In another embodiment, configuration modification program 300 obtains data associated with a workload for analysis from an aspect of monitoring 123 and/or monitoring functions 103.

In some embodiments, configuration modification program 300 analyzes data associated with a workload utilizing one or more time-based rates of data mirroring and/or one or more other criteria, such as triggering events or SMF messages. In one scenario, configuration modification program 300 analyzes data associated with a workload based on various statistical methods known in the art, such as median, standard deviation, moving average, etc. In another scenario, configuration modification program 300 analyzes data associated with a workload to identify one or more time and/or date-based patterns, or trends related to the data mirroring for an application. In one example, configuration modification program 300 may identify a time-based pattern that affects one or more aspects of a set of configuration information and that can be modeled with respect to one or more feedback/control variables (e.g., proportional, integral, and derivative terms), thereby reducing instabilities associated with too frequent modifications to a configuration associated with data mirroring. In another example, configuration modification program 300 may identify a time-based pattern that affects one or more aspects of a set of configuration information associated with data mirroring and is modeled with respect to one or more mathematical models, such a rational function, a regression analysis, etc.

Still referring to step 304 in various embodiments, step 304 and step 306 of configuration modification program 300 interact and test various models, sets of settings and parameters utilized by copy program 122 and/or sets of configuration information associated with data mirroring. In a further embodiment, configuration modification program 300 utilizes one or more models generated by machine learning to analyze data associated with a workload with respect to multiple variables that affect data mirroring for a workload, such as loading of the system 120, the loading of system 101, and/or quantities of data traffic utilizing network 140. In an example, if configuration modification program 300 analyzes the current performance monitoring information associated with a workload and the analyses do not forecast or anticipate the current performance information within a threshold for the workload 107, then configuration modification program 300 queries a database (e.g., database 124 and/or database 150) to identify another model that does forecast the performance information, or configuration modification program 300 performs machine learning to generate a new model. In an example, configuration modification program 300 utilizes machine learning to identify one or more patterns related multiple variables that affect data mirroring, such as intra-workload patterns, instance-to-instance related patterns, and/or patterns related to information associated with data mirroring (e.g., network delays, network bandwidth constraints, hardware changes, etc.).

In step 306, configuration modification program 300 modifies a configuration related to data mirroring. A configuration related to data mirroring includes a set of parameters and setting related to data mirroring and/or one or more tasks of copy program 122, such as a size of a buffer allocated within LPAR 127, a value for a number of reader tasks (e.g., base reader tasks and additional reader tasks), a number of reader task aliases assigned to reader tasks, etc. In addition, configuration modification program 300 applies the modified configuration and/or set of parameters and settings to one or more aspects of LPAR 127. In an embodiment, configuration modification program 300 verifies that the resources allocated to LPAR 127 are sufficient to accommodate a modification to a set of configuration information prior to applying the modified set of configuration information. If configuration modification program 300 determines that LPAR 127 has dynamic provisioning active, then modification program 300 determines the range of resources that are available to LPAR 127. In addition, configuration modification program 300 may be constrained to modify a configuration related to data mirroring based on conditions that are not directly reversible. In an example, configuration modification program 300 can readily activate and deactivate reader aliases to control the bandwidth of communications within network 140. However, after adding another pair of network ports and a related base reader task to increase bandwidth, configuration modification program 300 cannot remover or deactivate the network ports and the related base reader task to decrease the bandwidth associated with network 140 and release resource while data mirroring is occurring.

In one embodiment, configuration modification program 300 modifies a set of configuration information related to an active application/workload mirroring by selecting a set of configuration information from among a plurality of sets of configuration information corresponding to a profile/application/workload stored within database 124. In various embodiments, configuration modification program 300 analyzes (step 304) a response to a modification to a set of configuration information with respect to current, forecast, or modeled data mirroring activity associated with a workload.

In some embodiments, configuration modification program 300 selects a set of configuration information base on one or more criteria, such a degree of similarity between stored sets of configuration information and various parameters and settings based on various analyses and/or models. In an example, an administrator of system 120 may define a degree of similarity as a weighted average of two or more factors. A threshold associated with determining a degree of similarity may be set an administrator of system 120. In another example, configuration modification program 300 may identify a similar configuration utilizing relationships identified by machine learning. In some scenarios, configuration modification program 300 identifies two or more configuration associated with data mirroring based on a lesser degree of similarity (e.g., large threshold) between the dictates for data mirroring, information associated with system 101, and information related to the network 140. In an example, configuration modification program 300 selects a set of configuration information of a lesser degree of similarity that is supported by the resources provisioned to LPAR 127.

Still referring to step 306 in other embodiments, if configuration modification program 300 cannot identify a set of configuration information within a threshold for a degree of similarity, then configuration modification program 300 can simulate a modification to a set of configuration information associated with the data mirroring. In one scenario, configuration modification program 300 executes I/O simulation program 125 within a separate test-LPAR (not shown) to mimic the current data mirroring activity based on one or more models of historic data mirroring activity related to a current workload. At least one test-LPAR may reproduce the provisioning of LPAR 127 and the set of parameters utilized by copy program 122. In another scenario, I/O simulations 125 modifies the output of an I/O simulation model to include other factors that can affect data mirroring, such as changes within network 140, changes that affect the network interfaces (e.g., network interface 106, network interface 126) and/or bursts of write activity.

In various scenarios, configuration modification program 300 utilizes one or more I/O simulations for a current workload and a defined array of changes to parameters utilizes by copy program 122, such as BufferSizes=20000 and 25000; Reader Tasks=4, 6, and 8; and reader task aliases per reader task of 0, 2, and 4 to test for changes to performance information based on each combination of parameters. Subsequently, configuration modification program 300 selects a set of parameters from among the tested combinations of parameters for modifying a set of configuration information associated with data mirroring based on performance results, such as minimizing the occurrence of write pacing during a simulated model of data mirroring activity. In another example, configuration modification program 300 simulates a modification to a set of configuration information associated with data mirroring based on one or more constrains, such as provisioning limitations of LPAR 127.

In a further embodiment, configuration modification program 300 determines that LPAR 127 has insufficient resources to implement a determined set of configuration information changes. If configuration modification program 300 determines that the data mirroring activity is associated with a critical application, then configuration modification program 300 identifies a set of configuration information within the provisioning constraints of LPAR 127 and does not modify the provisioning of the active instance of LPAR 127 of the storage system. However, program 300 flags and stores the modified set of configuration information including the updated provisioning requirements of LPAR 127 as a sets of configuration information associated with data mirroring for a subsequent instance of provisioning and initiation of LPAR 127.

In step 308, configuration modification program 300 stores information associated with the modified configuration related to data mirroring. In addition, configuration modification program 300 can store the results of the analyses of data mirroring (e.g., time-base rates) associated with a workload, changes to one or more models, and/or one or more new models within one or more databases for subsequent usage. In various embodiments, configuration modification program 300 stores information related to the modified set of configuration information associated with the storage system includes, but is not limited to, a set of information related to hardware associated with system 101; information related to network 140, such as a bandwidth associated with instances of communication path 142; a set of parameters and settings utilized by copy program 122; results of one or more analyses of performance information associated with data mirroring; current and proposed provisioning information for LPAR 127; and/or an one or more new/updated models related to rates of data mirroring associated with an application (not shown) executing on system 101.

In one embodiment, configuration modification program 300 stores information associated with the modified configuration related to data mirroring for system 120 within database 124 of system 120 for subsequent use. In one example, configuration modification program 300 stores information associated with the modified configuration related to data mirroring within database 124 for use with subsequent executions of an application (not shown) that generates data for mirroring to system 120. In another example, configuration modification program 300 stores information associated with the modified configuration related to data mirroring to database 124 for provisioning a new instance of LPAR 127. In another embodiment, configuration modification program 300 stores information associated with the modified configuration related to data mirroring within database 150 for access by other storage systems that store mirrored data.

In decision step 309, configuration modification program 300 determines whether to modify the configuration associated with data mirroring. In one embodiment, configuration modification program 300 determines to modify the configuration associated with data mirroring based on one or more models and one or more variables, such as time, a change to a rate of data mirroring, or a message indicating a delay that exceeds a threshold value. In an example, configuration modification program 300 modified a configuration related to data mirroring at Step 306; however, configuration modification program 300 also determines that a time-based model forecasts that a different modification to the configuration associated with data mirroring will occur at a future time. In response, configuration modification program 300 pauses at decision step 309 unit the forecast point in time occurs. In another example, configuration modification program 300 pauses at decision step 309 while performance data is obtain. In response to the performance data achieving a threshold value, configuration modification program 300 resumes to modify the configuration associated with data mirroring.

In some embodiment, configuration modification program 300 defaults to modifying the configuration associated with data mirroring and pauses at Step 302 while awaiting a change to the determined information associated with data mirroring, such as identifying SMF messages related to write pacing or delays associated with mirroring data from buffers 111 to LPAR 127. In other embodiments, configuration modification program 300 defaults to not modifying the configuration associated with data mirroring. In an example, if configuration modification program 300 is a task spawned by copy program 122, then configuration modification program 300 may be set to default to not modifying the configuration associated with data mirroring because copy program 122 can spawn a new instance of configuration modification program 300 in response to one or more triggers, thresholds, and/or SMF messages. In another embodiment, if configuration modification program 300 determines that LPAR 127 and/or system 120 requires a restart, then configuration modification program 300 does not modify the configuration associated with data mirroring.

Responsive to determining to modify the configuration associated with data mirroring (Yes branch, decision step 309), configuration modification program 300 loops (step 302) to determine whether a change occurred to the information associated with data mirroring.

Responsive to determining not to modify the configuration associated with data mirroring (No branch, decision step 309), configuration modification program 300 terminates.

Figure 4:
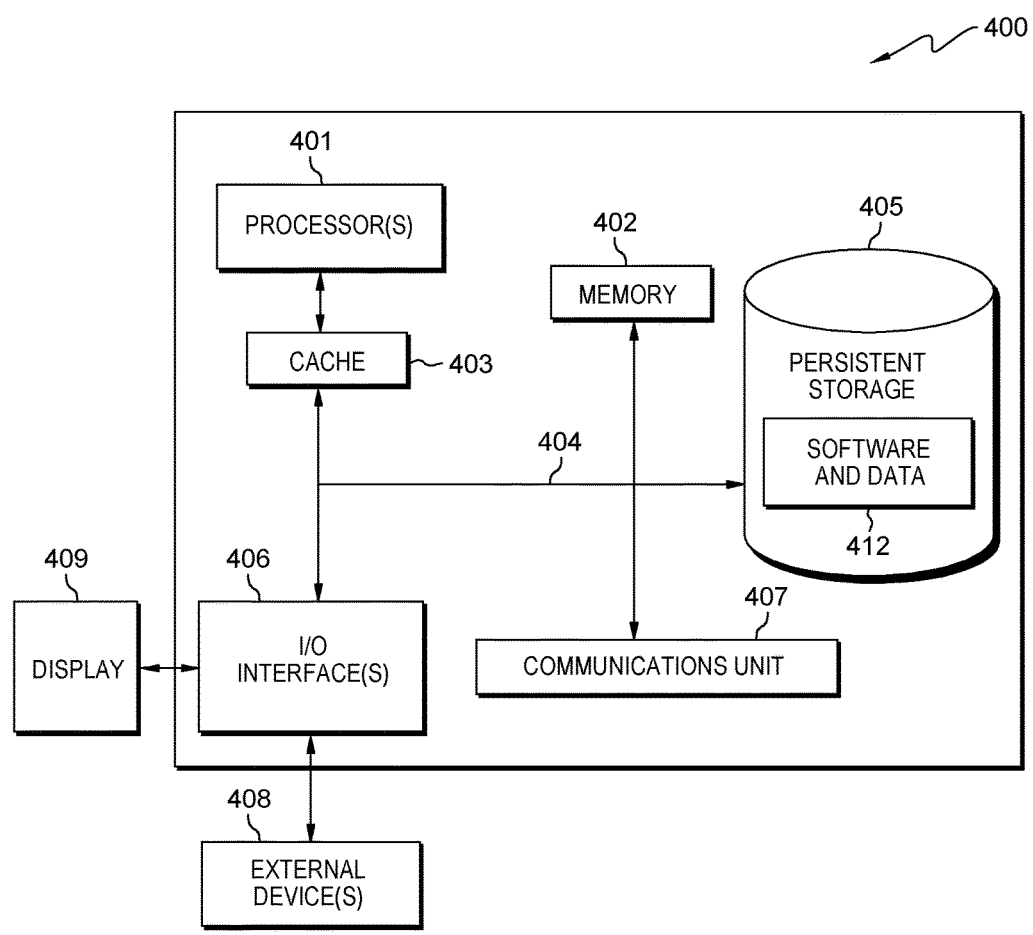
FIG. 4 is a block diagram of components of a computer, in accordance with an embodiment of the present invention.

FIG. 4 depicts a block diagram of computer system 400, which is representative of system 101, system 120, and database 150. Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and I/O interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch. In some embodiments, internal communication paths 115, 128, and 129 are representative of a portion of communication fabric 404.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402. In an embodiment, with respect to storage 110, buffers 111 are based on a portion of memory 402 associated with caching data for a storage subsystem.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. In one embodiment, with respect to system 101, storage 110 is included in persistent storage 405. In another embodiment, with respect to system 120, storage 130 is included in persistent storage 405.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 101, software and data 412 includes: system functions 102, monitoring functions 103, database 104, and various programs (not shown). With respect to system 120, software and data 412 includes system functions 121, copy program 122, monitoring functions 123, database 124, I/O simulation program 125, configuration modification program 300, and various programs and data (not shown). With respect to storage 110 and/or storage 130 software and data 412 includes embedded firmware and microcode.

Communications unit 407, in these examples, provides for communications with other data processing systems or devices, including resources of system 101, system 120, and database 150. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user/client and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, the phrase "based on" should be interpreted to mean "based, at least in part, on."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for modifying a configuration of a storage system, the method comprising:
   querying, by one or more computer processors, a network-accessible computing system to obtain information associated with an executing application that utilizes a storage system for a process of data mirroring;
   identifying, by one or more computer processors, a set of parameters associated with a copy program executing within a logical partition (LPAR) of the storage system based on the obtained information, wherein the set of parameters dictates a number of reader tasks utilized by the copy program, wherein the copy program is a program associated with the process for data mirroring from the network-accessible computing system to the storage system;
   executing, by one or more computer processors, the dictated number of reader tasks for the process of mirroring data associated with the executing application, from the network-accessible computing system to the storage system;
   forecasting, by one or more computer processors, a change to a rate related to the process of mirroring data to the storage system by utilizing one or more models associated with the executing application;
   determining, by one or more computer processors, based on one or more criteria, that a different number of reader tasks and respectively associated reader task aliases execute to support the forecast change to the rate of related to the process of mirroring data to the storage system;
      wherein the one or more criteria utilized to determine the different number of reader tasks and respective reader task aliases execute to support the forecast change to the rate related to the process of mirroring data are selected from a group consisting of: a dictated that limits the number of modifications that occur within a period of time, a dictate that limits the number of active reader tasks and reader task aliases based on the resource available to the LPAR, and a period of time; and
   modifying, by one or more computer processors, the number of executing reader tasks and the number of respectively associated active reader task aliases within the set of parameters corresponding to the copy program within the LPAR based on the forecast change to the rate related to the process of mirroring data from the network-accessible computing system to the storage system.

2. The method of claim 1, wherein the set of parameters includes a first value corresponding to a number of reader tasks executing for the copy program executing within the LPAR and a second value related to a maximum number of reader task aliases corresponding to each reader task.

3. The method of claim 2, wherein an executing reader task is associated with an amount of network bandwidth available for the process of mirroring data from the network-accessible computing system to the storage system, and wherein the amount of network bandwidth available for the process of mirroring data from the network-accessible computing system to the storage system is increased by activating one or more reader task aliases assigned to a respective reader task.

4. The method of claim 1, further comprising:
   determining, by one or more computer processors, that a duration corresponding to a delay related to the process of mirroring data, associated with the executing application, to the storage system exceeds a threshold value, wherein the duration corresponding to the delay related to the process of mirroring data is based on the obtained information;
   determining, by one or more computer processors, a number of reader task aliases to activated to increase a network bandwidth for the mirroring of data from the network-accessible computing system to the storage system;
   verifying, by one or more computer processors, that the LPAR includes sufficient resources for the process of mirroring data based on the increase of network bandwidth between the network-accessible computing system to the storage system; and
   in response to verifying that the LPAR includes sufficient resources to process the mirroring of data based on an increasing bandwidth, modifying, by one or more computer processors, a number of active reader task aliases within the set of parameters corresponding to respective reader tasks initiated for the copy program executing within the LPAR.

5. The method of claim 1, further comprising:
   monitoring, by one or more computer processors, the process of mirroring data, associated with the executing application, to the storage system to determine a plurality of historical, time-based rates related to the process of mirroring data to the storage system;
   analyzing, by one or more computer processors, the plurality of historical, time-based rates related to the process of mirroring data to generate one or more models related to the process of mirroring data, associated with the executing application, wherein a model related to the process of mirroring data, associated with the executing application, is further associated with one or more sets of parameters utilized by the executing of the copy program; and
   storing, by one or more computer processors, the one or more generated models and the associated one or more sets of parameters utilized by the of the copy program within a database accessible by the storage system.

6. A computer program product for modifying a configuration of a storage system, the computer program product comprising:
   one or more computer readable storage media and program instructions stored on the one or more computer readable storage media, the program instructions readable/executable by one or more computer processors and further comprising:
      program instructions to query a network-accessible computing system to obtain information associated with an executing application that utilizes a storage system for a process of data mirroring;
      program instructions to identify a set of parameters associated with a copy program executing within a logical partition (LPAR) of the storage system based on the obtained information, wherein the set of parameters dictates a number of reader tasks utilized by the copy program, wherein the copy program is a program associated with the process for data mirroring from the network-accessible computing system to the storage system;

program instructions to execute the dictated number of reader tasks for the process of mirroring data associated with the executing application, from the network-accessible computing system to the storage system;

program instructions to forecast a change to a rate related to the process of mirroring data to the storage system by utilizing one or more models associated with the executing application;

program instructions to determine, based on one or more criteria, that a different number of reader tasks and respectively associated reader task aliases execute to support the forecast change to the rate of related to the process of mirroring data to the storage system;

wherein the one or more criteria utilized to determine the different number of reader tasks and respective reader task aliases execute to support the forecast change to the rate related to the process of mirroring data are selected from a group consisting of: a dictated that limits the number of modifications that occur within a period of time, a dictate that limits the number of active reader tasks and reader task aliases based on the resource available to the LPAR, and a period of time program instructions to modify the number of executing reader tasks and the number of respectively associated active reader task aliases within the set of parameters corresponding to the copy program within the LPAR based on the forecast change to the rate related to the process of mirroring data from the network-accessible computing system to the storage system.

7. The computer program product of claim 6, wherein the set of parameters includes a first value corresponding to a number of reader tasks executing for the copy program executing within the LPAR and a second value related to a maximum number of reader task aliases corresponding to each reader task.

8. The computer program product of claim 7, wherein an executing reader task is associated with an amount of network bandwidth available for the process of mirroring data from the network-accessible computing system to the storage system, and wherein the amount of network bandwidth available for the process of mirroring data from the network-accessible computing system to the storage system is increased by activating one or more reader task aliases assigned to a respective reader task.

9. The computer program product of claim 6, further comprising:

program instructions to determine that a duration corresponding to a delay related to the process of mirroring data, associated with the executing application, to the storage system exceeds a threshold value, wherein the duration corresponding to the delay related to the process of mirroring data is based on the obtained information;

program instructions to determine a number of reader task aliases to activated to increase a network bandwidth for the mirroring of data from the network-accessible computing system to the storage system;

program instructions to verify that the LPAR includes sufficient resources for the process of mirroring data based on the increase of network bandwidth between the network-accessible computing system to the storage system; and program instruction to respond to verifying that the LPAR includes sufficient resources to process the mirroring of data based on an increasing bandwidth by modifying a number of active reader task aliases within the set of parameters corresponding to respective reader tasks initiated for the copy program executing within the LPAR.

10. The computer program product of claim 6, further comprising:

program instructions to monitor the process of mirroring data, associated with the executing application, to the storage system to determine a plurality of historical, time-based rates related to the process of mirroring data to the storage system;

program instructions to analyze the plurality of historical, time-based rates related to the process of mirroring data to generate one or more models related to the process of mirroring data, associated with the executing application, wherein a model related to the process of mirroring data, associated with the executing application, is further associated with one or more sets of parameters utilized by the executing of the copy program; and program instruction to store the one or more generated models and the associated one or more sets of parameters utilized by the of the copy program within a database accessible by the storage system.

11. A computer system for modifying a configuration of a storage system, the computer system comprising:

one or more computer processors;

one or more computer readable storage media;

program instructions stored on the computer readable storage media for reading/execution by at least one of the one or more computer processors, the program instructions further comprising:

program instructions to query a network-accessible computing system to obtain information associated with an executing application that utilizes a storage system for a process of data mirroring;

program instructions to identify a set of parameters associated with a copy program executing within a logical partition (LPAR) of the storage system based on the obtained information, wherein the set of parameters dictates a number of reader tasks utilized by the copy program, wherein the copy program is a program associated with the process for data mirroring from the network-accessible computing system to the storage system;

program instructions to execute the dictated number of reader tasks for the process of mirroring data associated with the executing application, from the network-accessible computing system to the storage system;

program instructions to forecast a change to a rate related to the process of mirroring data to the storage system by utilizing one or more models associated with the executing application;

program instructions to determine, based on one or more criteria, that a different number of reader tasks and respectively associated reader task aliases execute to support the forecast change to the rate of related to the process of mirroring data to the storage system;

wherein the one or more criteria utilized to determine the different number of reader tasks and respective reader task aliases execute to support the forecast change to the rate related to the process of mirroring data are selected from a group consisting of: a dictated that limits the number of modifications that occur within a period of time, a dictate that limits the number of active reader tasks and reader task aliases based on the resource available to the LPAR, and a period of time;

program instructions to modify the number of executing reader tasks and the number of respectively associated active reader task aliases within the set of parameters corresponding to the copy program within the LPAR based on the forecast change to the rate related to the process of mirroring data from the network-accessible computing system to the storage system.

12. The computer system of claim 11, wherein the set of parameters includes a first value corresponding to a number of reader tasks executing for the copy program executing within the LPAR and a second value related to a maximum number of reader task aliases corresponding to each reader task.

13. The computer system of claim 12, wherein an executing reader task is associated with an amount of network bandwidth available for the process of mirroring data from the network-accessible computing system to the storage system, and wherein the amount of network bandwidth available for the process of mirroring data from the network-accessible computing system to the storage system is increased by activating one or more reader task aliases assigned to a respective reader task.

14. The computer system product of claim 11, further comprising:

program instructions to determine that a duration corresponding to a delay related to the process of mirroring data, associated with the executing application, to the storage system exceeds a threshold value, wherein the duration corresponding to the delay related to the process of mirroring data is based on the obtained information;

program instructions to determine a number of reader task aliases to activated to increase a network bandwidth for the mirroring of data from the network-accessible computing system to the storage system;

program instructions to verify that the LPAR includes sufficient resources for the process of mirroring data based on the increase of network bandwidth between the network-accessible computing system to the storage system; and program instruction to respond to verifying that the LPAR includes sufficient resources to process the mirroring of data based on an increasing bandwidth by modifying a number of active reader task aliases within the set of parameters corresponding to respective reader tasks initiated for the copy program executing within the LPAR.

15. The computer system of claim 11, further comprising:

program instructions to monitor the process of mirroring data, associated with the executing application, to the storage system to determine a plurality of historical, time-based rates related to the process of mirroring data to the storage system;

program instructions to analyze the plurality of historical, time-based rates related to the process of mirroring data to generate one or more models related to the process of mirroring data, associated with the executing application, wherein a model related to the process of mirroring data, associated with the executing application, is further associated with one or more sets of parameters utilized by the executing of the copy program; and program instruction to store the one or more generated models and the associated one or more sets of parameters utilized by the of the copy program within a database accessible by the storage system.

* * * * *